United States Patent [19]

Sabatino

[11] Patent Number: 4,708,157

[45] Date of Patent: Nov. 24, 1987

[54] AIR ELIMINATOR FOR FLUID HANDLING SYSTEMS

[75] Inventor: Daniel Sabatino, Burlington, Conn.

[73] Assignee: Flowtron Industries, Inc., Terryville, Conn.

[21] Appl. No.: 916,145

[22] Filed: Oct. 7, 1986

[51] Int. Cl.⁴ .............................................. B01D 19/00
[52] U.S. Cl. ..................................... 137/179; 137/192; 55/216; 251/901
[58] Field of Search ............................... 137/192, 179; 251/DIG. 901; 55/159, 216

[56] References Cited

U.S. PATENT DOCUMENTS

| | | | |
|---|---|---|---|
| 2,489,461 | 11/1949 | Parrish | 137/192 X |
| 2,675,025 | 4/1954 | Wynkorp | 251/901 X |
| 3,523,408 | 8/1970 | Rosenberg | 55/159 |
| 3,672,394 | 6/1972 | Erwin . | |
| 4,149,860 | 4/1979 | Kulik | 55/159 |
| 4,306,580 | 12/1981 | Wallquist | 137/192 |

*Primary Examiner*—Alan Cohan
*Attorney, Agent, or Firm*—Pollock, Vande Sande and Priddy

[57] ABSTRACT

An air eliminator for liquid handling systems comprises a cylindrical container having a liquid inlet and a liquid outlet which are separated from one another by a cylindrical porous barrier positioned to subdivide the interior of the container into first and second chambers. The cylindrical barrier comprises a porous membrane which permits liquid to flow from the first chamber to the second chamber while preventing the passage therethrough of any gases which are entrained in incoming liquid supplied to the first chamber. Any such entrained gases accumulate in an air space located in the first chamber and are vented from the first chamber at atmospheric pressure. Liquid passing through the membrane, free of entrained gases, accumulates in the second chamber within the cylindrical barrier, and then passes to the liquid outlet via a modulating valve in the second chamber. The modulating valve achieves a balance of flow between liquid entering the first chamber and liquid leaving the second chamber, and comprises a float, a valve body, and associated seals so arranged that forces exerted on the seals by the float are at 90° to forces exerted on the seals by liquid seeking to exit the second chamber.

13 Claims, 4 Drawing Figures

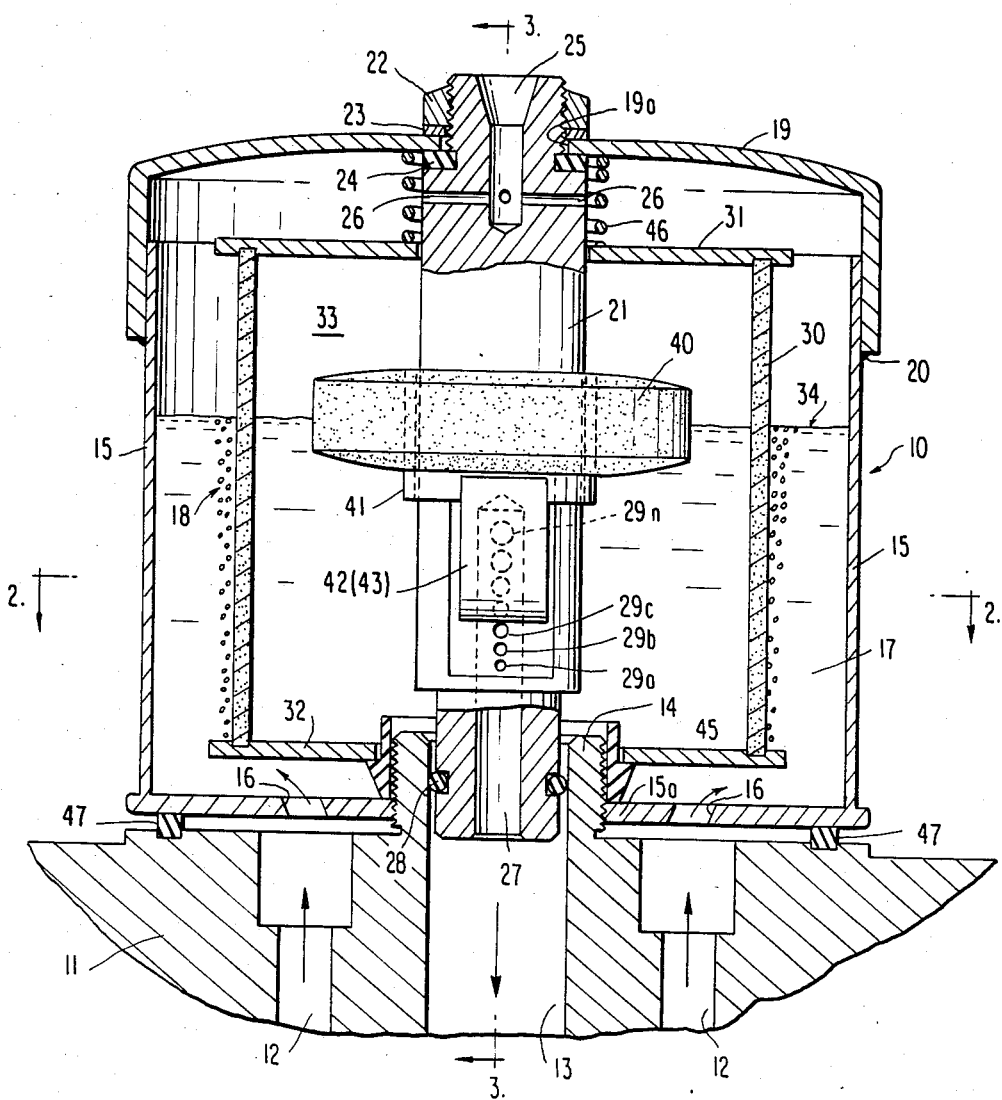

AIR ELIMINATOR FOR FLUID HANDLING SYSTEMS

BACKGROUND OF THE INVENTION

The present invention relates to an air eliminator which can be used in conjunction with a flow metering device, e.g., turbine meters and other types of meters known in the art such as those termed "Flowtron" meters of the types described in Wilkens at al U.S. Pat. No. 3,714,823 dated Feb. 6, 1973, for "Fuel Consumption Meter", Sabatino et al U.S. Pat. No. 3,937,083 dated Feb. 10, 1976, for "Temperature-Compensating Liquid Meter", and Sabatino et al U.S. Pat. No. 4,253,332 dated Mar. 3, 1981, for "Sealed Flow Meter For In-Tank Installation". Such flow metering devices are used to measure liquid flow in various applications, e.g., to measure the fuel consumed by an internal combustion or diesel engine, or to measure fuel oil consumed by an open-flame furnace, or for use in other types of liquid handling systems such as those involving the batching of chemicals or other liquids, e.g., the dispensing of catalysts in precise proportions.

To assure accurate metering, it is important that air and/or vapor which is engrained in the liquid or fuel being measured not be permitted to enter the measuring chamber of the meter since such entrained air and/or vapor would cause a volumetric error. In some cases this condition can be achieved by simply mounting the meter in the system in such fashion that this cannot occur. However in many cases the addition of an air eliminator is necessary. For example, one major application for meters of the type described above is to measure the fuel consumed by a heavy-duty truck utilizing, for example, a diesel engine. Some diesel engines in trucks return fuel from the injection system mixed with vapor and air. Air eliminators have been suggested heretofore, and are commercially available, which are installed in the liquid flow lines at an appropriate location upstream or downstream of the metering device, depending on the particular type and operational characteristics of the metering device employed, and which are intended to eliminate entrained vapor and air from liquid or fuel passing through the metering device to or from a supply tank and a utilization device, e.g., a diesel engine. However, these prior air eliminators or separators have been found to be unsatisfactory, and detract from accurate measurements, since they typically employ a needle and seat type of float valve that controls air which escapes through a vent opening and which, because of its construction, causes a back pressure to the engine's return line. In addition, such prior devices do not control the liquid flow exiting from the air eliminator, other than to provide a on-off control device which operates whether the device is venting air or not.

To accurately measure fuel consumed, for example, by a diesel engine, moreover, the metering system must be capable of differentiating between the fuel that is drawn from the supply tank to the engine, and the unused fuel which returns from the engine back to the supply tank. This circulation of fuel is further complicated, in some diesel engines, by air and combustion gases that are introduced into the fuel by the engine's fuel injection system. In engines operating in this fashion the mixture of air and fuel is returned back to the supply tank, and the tank is vented to atmosphere so that, hopefully, the entrained gases returned to the supply tank escape from the fuel and vent-off. If this does not occur, however, and the percentage of air retained in the supply tank remains significant, the entrained air will reduce the power that the engine can deliver, and may in fact cause the engine to stall so that it needs priming to restart.

Therefore in addition to providing an air eliminator which can be used with volumetric measuring devices to assure that such devices accurately measure liquid that passes through the meter free from entrained air, it is also important that the entrained air be prevented from re-entering the engine in a return fuel line to the supply tank so as to assure efficient operation of the engine.

These results are accomplished by the novel air eliminator of the present invention which can be used in conjunction with flow metering devices for the various applications described above and which, moreover, finds utility as a stand alone air eliminator that can be used in any liquid handling application where the elimination of entrained air or gases is necessary or desirable.

SUMMARY OF THE INVENTION

The present invention will be described principally in conjunction with a fuel flow system of the type employed in, for example, a diesel engine, but can be used in other applications of the types referred to above. The term "liquid" used hereinafter is accordingly intended to cover automotive and diesel fuels as well as other types of chemicals or liquids which may be employed in different systems with which the air eliminator is utilized. In addition, the gases which are entrained in a liquid being handled, and which are to be eliminated by the apparatus of the present invention, may constitute air or other gases or vapors; and the term "air" employed hereinafter is used simply for convenience and is intended to be generic to such other vapors or gases.

The air eliminator takes the form of a comparatively inexpensive, permanently enclosed, throwaway canister. A base unit, which contains inlet and outlet ports, and which is of a type similar to those used in so-called "spin-on" oil filters, is mounted to the frame of a truck or vehicle (in the fuel flow embodiments of the invention), and all fuel lines (in and out) are connected to said base unit. The base unit includes an externally threaded central hub surrounding a fuel outlet port, and the lower central portion of the aforementioned canister is complementarily threaded so that it can be screwed onto the base. The base unit further includes a plurality of inlet ports which are disposed in spaced relation to one another along a circle surrounding the outlet port in the base unit; and these inlet ports communicate with liquid inlets in a base end plate of the aforementioned canister. An O-ring seal is disposed outwardly of the fuel inlet ports in the base unit and in the canister to assure proper communication therebetween.

The interior of the canister contains a cylindrical barrier taking the form of a tubular microporous membrane whose opposing ends are closed by nonporous end caps. The region between the exterior of said cylindrical barrier and the interior walls of the cylindrical canister define a first chamber which communicates with the liquid inlet ports in the bottom end plate of the canister, while the interior of the cylindrical barrier defines a second chamber which communicates with the outlet ports of the canister and base unit via a modulating valve whose flow characteristic varies with variations in the liquid level within the second chamber.

In operation, liquid flowing from the base unit inlet ports through the liquid inlets in the canister accumulates as a body of liquid within the aforementioned first chamber around the exterior of the aforementioned cylindrical barrier. The porous membrane forming the barrier comprises a material which permits fuel to seep therethrough from the first chamber exterior of the cylindrical barrier to the second chamber within that cylindrical barrier, but prevents the passage of air therethrough. Any entrained air in the entering liquid accordingly collects on the exterior of the cylindrical barrier, i.e., on that surface of the cylindrical barrier which faces the first chamber, and rises as bubbles through the liquid in the first chamber into an air space in the first chamber located above the surface of the liquid in said first chamber. The said air space is directly vented to the atmosphere (e.g. to an air line which returns separated air, vapors and gases to the supply tank) via an opening in the canister that communicates said air space to the exterior of the canister, the vent opening being free of any valving mechanism that would tend to permit a build-up of pressure within the air space in the aformentioned first chamber thereby to assure that the said air space remains at atmospheric pressure. The body of liquid which collects in the second chamber, i.e., within the cylindrical barrier in the air eliminator device, is accordingly free of entrained air, and is discharged from the said second chamber through a liquid outlet opening in the canister to the liquid outlet port in the aforementioned base unit.

The fuel discharge function is controlled by a modulating valve which is located within the second chamber, i.e., within the cylindrical barrier, and which operates to assure that there is a balance of flow between liquid entering the first chamber through the liquid inlet in the canister and liquid leaving said second chamber through the liquid outlet in the canister.

The modulating valve comprises a valve body having a plurality of differently sized passages therein that are disposed in vertically spaced parallel relation to one another. Each passage is adapted, when open, to permit the flow of fuel from the second chamber to the liquid outlet in the canister. A toroidal float surrounds the valve body for movement along a linear path that is transverse, and preferably perpendicular, to the directions of extension of the several flow passages in the valve body, and an elongated curtain of plastic or rubber sealing material, attached at one of its ends to the float and attached at its other end to the valve body above the uppermost one of the aforementioned passages, extends in a loop configuration across the ends of the passageways that face the second chamber. By reason of this configuration, movement of the float in an upward direction tends to strip the curtain away from the inlet openings of successive different ones of said passages to increase the volume of the effective flow passageway that extends through the valve body from the second chamber to the liquid outlet, and movement of the float in the opposite, i.e., downward direction, performs the opposite function, i.e., it closes off the inlet ends of successive different ones of the said flow passages to reduce the volume of the effective flow passageway through the valve body. Inasmuch as the forces exerted on the flexible curtain seal by the float are transverse, i.e., preferably orthogonal, to the forces that are exerted on the curtain seal by liquid seeking to pass from the second chamber into the valve passages, the forces exerted by fluid flow do not change the buoyant force of the float so that, as a result, the valve can accurately modulate flow rates through a range of such rates down to and including complete cutoff.

BRIEF DESCRIPTION OF THE DRAWINGS

The foregoing objects, advantages, construction and operation of the present invention will become more readily apparent from the following description and accompanying drawings in which:

FIG. 1 is a cross-sectional view of an air eliminator constructed in accordance with a preferred embodiment of the present invention;

FIG. 2 is a cross-sectional view of the air eliminator taken on line 2—2 of FIG. 1;

DESCRIPTION OF THE PREFERRED EMBODIMENTS

Figure 3:
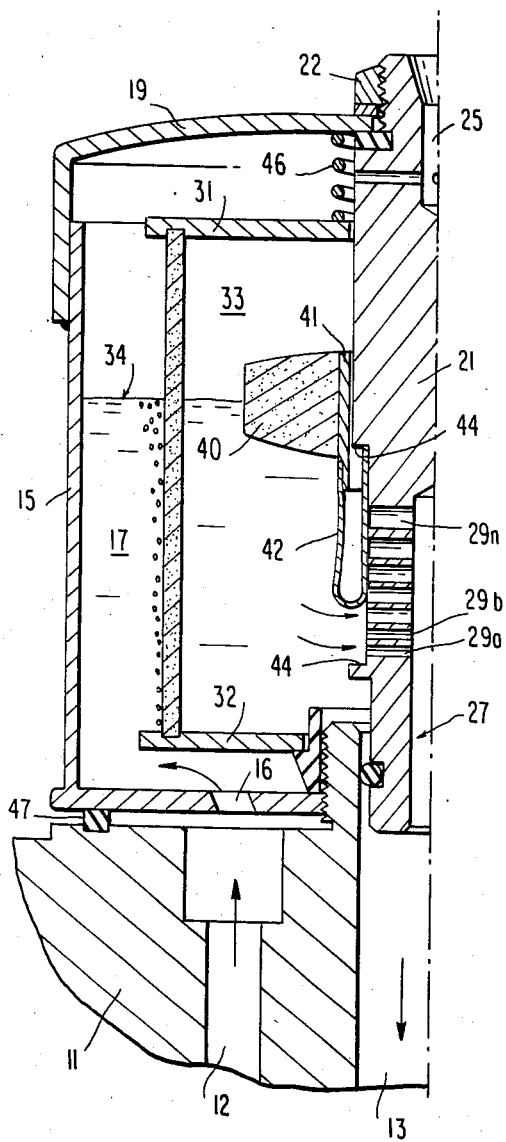
FIG. 3 is a cross-sectional view of the air eliminator of the present invention, taken on line 3—3 of FIG. 1, showing in a left half-view the structure and operation of the modulating valve used in the present invention.

The air eliminator of the present invention comprises a canister 10 which is connected to a cast aluminum base 11 is such fashion that the canister 10 can be readily attached to said base by a simple rotary screwing operation, or readily detached from said base by unscrewing it therefrom, and then discarded and replaced by a like such canister from time to time. Base 11 is adapted to be fixedly mounted at a desired location within a vehicle when used in a fuel handling system wherein vehicular fuel consumption is being measured. Fuel inlet lines are connected to fuel inlet ports 12 in the base while a fuel outlet line is connected to an outlet port 13 in the base. The inlet ports 12 are disposed on a circle which surrounds and is coaxial with outlet port 13, and outlet port 13 in turn extends through an externally threaded fitting 14 which protrudes outwardly or upwardly from the base and which is adapted to be thread engaged by complementary threads formed in the lower end plate 15a of a cylindrical container 15 that defines the exterior of the canister 10. Said end plate 15a is provided with fuel inlets 16 which communicate with fuel inlet ports 12 in the base unit 11 to permit incoming fuel to enter a first chamber 17 which is disposed between the interior surface of contained 15 and the external surface of a cylindrical barrier 18 located within the canister in coaxial relation thereto.

The top of canister 10 comprises a cup-shaped cover 19 whose downwardly depending sides are welded, as at 20, to tubular container 15. A solid metallic rod 21 has a reduced diameter externally threaded upper end which protrudes through a central opening in cover 19 to the exterior of the cover, the rod being fixed to cover 19 by a nut 22 which cooperates with gaskest 23 and 24 disposes externally and internally of cover 19 to provide an airtight seal between cover 19 and the upper end of rod 21. The said upper end of rod 21 is machined to define an axial bore 25 and is cross drilled as at 26 into the said bore 25 from the exterior of the rod 21 to provide an open air vent adjacent the center of cover 19 which communicates an air space at the top of the aforementioned chamber 17 through passageways 26 and 25 to the exterior of the container to vent the air space in the upper portion of chamber 17 to the atmosphere (e.g. to an air line extending from bore 25 to the top of the fuel supply tank in the fuel handling system) and which assures that said air space is maintained at atmospheric pressure.

The lower end of rod 21 extends into the threaded fitting 14 in base unit 11, and is sealed at its exterior to the inner walls of fuel outlet port 13 by means of an O-ring 28. A bore 27 is machined into the lower end of rod 21, extends partially along the axis of said rod toward bore 25, and is intercepted by a plurality of passageways 29a, 29b, 29c, . . . 29n which are cross drilled in the lower end of rod 21 into bore 27. The several cross passageways 29a . . . 29n extend horizontally in vertically spaced relation to one another along rod 21 and are of successively larger diameter from 29a to 29n to define a portion of the modulating valve to which reference has been made previously, and which will be described more fully hereinafter in reference to FIGS. 3 and 4.

The cylindrical barrier 18 comprises a microporous membrane 30 whose upper and lower ends are closed respectively by imperforate end plates 31 and 32 to enclose a second chamber or float chamber 33 within the canister 10. Membrane 30 contains pores which are so sized that fuel admitted via inlets 16 to the aforementioned first chamber 17 can pass through said membrane into the said second chamber 33, but the pores are so small that air (vapors, gases, etc.) cannot so pass. The membrane 30 may be fabricated, for example, of a porous fluoroplastic which is available in rigid tubular form from Porex Technologies, Fairburn, Ga., under the designation "PVDF". In the alternative, the membrane 30 may be fabricated of other commercially available filter materials, such as an appropriate filter paper, but in such case the filter paper should be associated with an appropriate supporting matrix to give the material 30 adequate rigidily and strength. It must be understood, however, that in a conventional vehicular application of the invention the fuel lines that are connected to inlet and outlet ports 12 and 13 in base unit 11 are normally associated with other filter units that filter the flowing fuel, and the membrane 30 within the air eliminator is not provided, therefore, to provide fuel filtering but, instead, is provided to achieve the aforementioned separation between fuel and air within the canister.

When an air eliminator is used as part of a flow metering system, it can have a dramatic effect on the flow rate through the meter. If the air eliminator design is such that it has a constantly changing internal fuel level, it may create false instantaneous rates of flow through the associated meter. In a diesel engine application, for example, fuel demand is constantly changing, and the flow rate of the return fuel entering the eliminator is therefore also constantly changing. The key to controlling the internal fuel level is, therefore, the provision of a sensitive modulating flow valve. A properly operable air eliminator should be one which removes all air from the fuel without creating any back pressure and which, in addition, is completely passive so that fuel flow into the eliminator equals fuel flow out of the eliminator.

The foregoing important criteria have not been present in air eliminators suggested heretofore since commercially available prior art air eliminators typically employ a needle and seat type of float valve that controls air escaping through a vent opening. These prior arrangements cause a back pressure to the engine's return line and, in addition, do not control liquid flow exiting from the air eliminator. The prior art devices are, basically, on-off devices regardless of whether they are venting air or not. These undesirable characteristics of prior art air eliminators are avoided in the present invention.

More particularly, the present invention separates air from fuel more effectively because the fuel in the air eliminator is not under pressure while it is passing through porous membrane 30. The pressure differential across membrane 30 is negligible, and therefore air entrained in the fuel in chamber 17 simply collects on the outside of membrane 30 and is not forced into the second chamber 33. The air forms small bubbles on the exterior of membrane 30, which coalesce or expand into larger bubbles that rise to the surface 34 of fuel in chamber 17, and pass into the air space above said surface 34 in the upper portion of chamber 17. This action occurs without creating any back pressure since the said air space in chamber 17 is constantly vented to atmosphere through open, i.e., unvalved, air vent 26, 25 which permits the separated air to escape and maintains the pressure within the aforementioned air space at atmospheric pressure.

The only active control in the device is the aforementioned modulating valve. Fuel or other liquid reaching the flow valve chamber 33 cannot leave the air eliminator without passing through the flow valve. The function of the flow valve is to achieve a balance of flow between liquid entering and liquid leaving the air eliminator, and accomplishes this result in a unique fashion.

Figure 4:
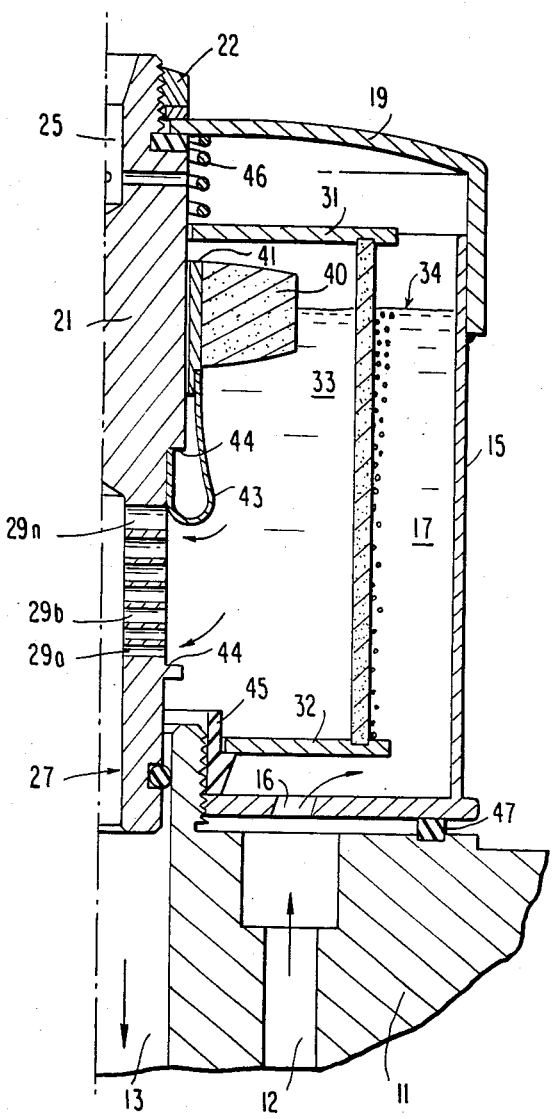
FIG. 4 is a right half-view similar to that shown in FIG. 3, but viewed on line 3—3 in the opposite direction to that designated in FIG. 1, depicting operation of the modulating valve for a different liquid level condition.

The valve consists of a toroidal float 40 which is mounted on a bushing 41 that surrounds rod 21 to constrain movement of the float to a linear vertical path along rod 21 within chamber 33. A pair of elongated, rectangular, thin plastic or rubber curtain seals 42, 43 are fastened at their opposing ends respectively to the bushing 41 and to rod 21 at a position above uppermost cross pasageway 29n, and each extends in a loop configuration, as shown in FIGS. 3 and 4, between its opposing ends. One end of each curtain seal 42, 43 is fastened to rod 21 within recesses 44 that are provided in the opposing vertical sides of rod 21 adjacent the outer ends of cross passages 29a . . . 29n, to permit the float 40 and its associated curtain seals 42, 43 to move freely upwardly and downwardly with changes in liquid level in chamber 33 without interference. The curtain seals can be fabricated, for example, of commercially available Viton rubber, a rubber which is compatible with fuel, and are thin enough to avoid being sucked into the entry ends of passages 29a . . . 29n by the velocity of fuel flowing into said passages, but are not so thin that the curtain seals are themselves deformed into said passageways. Each seal comprises a strip of flexible material approximately ½ inch wide, approximately 3 inches long, and approximately 0.015 inches thick.

As the fuel level within chamber 33 rises (compare in this respect FIGS. 3 and 4) the float assembly 40, 41 follows the liquid level and lifts the curtain seals 42, 43 away from each of the cross passages 29a . . . 29n progressively. When the float assembly 40, 41 is at the bottom of its travel, the curtain seals 42, 43 cover the entry ends of every one of the cross passages 29a, etc., and the smallest suction at these passages cause the curtains to form a liquid tight seal. As the float assembly rises, however, successive ones of said passages are uncovered and, due to the fact that said cross passages are of progressively larger diameter, the effective flow passageway through the modulating valve progressively increases in volume to permit greater and greater quantities of fuel to be discharged from chamber 33 through the modulating valve to central bore 27 and thence to fuel outlet port 13 in base unit 11.

An important improvement effected by the modulating valve employed in the present invention, over other types of float valves, is that the force exerted by the float on the curtain seals due to the buoyancy of the float, and the suction force exerted on the seals by liquid flowing through the valve, are at 90° to one another. In valve designs suggested heretofore, the arrangement has been such that a float raises and lowers a needle or tapered spool into and out of an orifice and seat, and as the spool begins to enter the seat and modulate flow, the liquid velocity increases so as to cause a greater downward force on the spool that overcomes the buoyancy of the float. As a result, the spool seats quickly and causes an abrupt end to the flow instead of achieving a smooth modulation of flow such as is accomplished by the modulating valve employed in the present invention. The reason for this uneven action in prior art valves is that the buoyant force of the float and the downward force of the spool are diametrically opposed to each other, rather than being transverse to one another as in the present invention.

The present invention allows a continuous modulation of flow rates from less than 0.5 gph to over 100 gph in a single compact valve design. This is because increasing flow rates into the float chamber 33 cause the float to gently peel the curtain seals away from the entry ends of each of the passageways 29a . . . 29n in rod 21. The action is smooth and continuous since, as the curtain seals modulate flow through the various passageways, the changing force on the curtain seals does not change the buoyant force of the float due to the 90° or transverse relationship of said forces to one another. As a result, the valve design permits flow rates to be accurately modulated down to complete cut-off, in contrast to prior art designs which become erratic or tend to oscillate on and off as the valve approaches cut-off. Moreover, the transverse force directions assure that the forces on the float and valve mechanism do not oppose one another, in contrast with other valve designs suggested heretofore wherein the valve may remain closed as a result of suction forces that overcome the buoyancy of the float, causing a flooding condition.

The overall air eliminator is assembled by first preparing a preassembly that consists of cover 19 having ros 21, formed in the manner previously described, attached thereto by means of nut 22 and seals 23, 24. A plastic bushing 45 is inserted into the lower end plate 32 of barrier 18 to provide a seal which will cover the threads on fitting 14 of base unit 11 when canister 10 is completed and screwed onto the base unit, to assure that fuel entering chamber 17 with air entrained therein cannot also leak past the said threads into inner chamber 33. The cylindrical porous barrier 18, with its lower end plate 32 seated on a shoulder provided in bushing 45 as illustrated in FIGS. 1, 3 and 4, is then inserted into the container 15; a spring 46 is placed on top of upper end plate 31 of cylindrical barrier 18 to resiliently force the barrier 18 downward into forcible sealing engagement with bushing 45, and to force said bushing into sealing engagement with lower end plate 15a, when cap 19 is installed; and the aforementioned preassembly consisting of cap 19 and central rod 21 is then inserted through float assembly 40, 41 and cylindrical barrier 18 and then pressed downwardly onto container 15 to compress spring 46 so that the internal parts of the canister reach the final desired positions shown in FIG. 1. Cap 19 is then welded into place to complete assembly of the canister.

The canister 10 is installed on the base unit 11 by first placing a flat surfaces O-ring 47 on the said base unit in surrounding relation to fuel ports 12, 13, and by then spinning canister 10 onto threaded fitting 14 of the base unit until the exterior surface of canister end plate 15a is in sealing engagement with O-ring 47. When so assembled fuel supplied to fuel inlet ports 12 in the base unit pass through communicating fuel inlets 16 in the canister into chamber 17; air is separated from the fuel by the action of porous membrane 30 and rises into the air space at the top of chamber 17 where it is directly vented to the exterior of the canister via vent 25, 26; fuel free of air passes through membrane 30 into flow chamber 33; and the fuel in said chamber 33 then passes through the modulating valve at the lower end of rod 21, under the control of said valve in the manner previously described, to bore 27 and thence to fuel outlet port 13 in base unit 11.

The overall structure achieves a dramatic improvement over air eliminators suggested heretofore since it is totally passive in its action and achieves a near perfect balance of flow into and out of the device. Therefore, when it is installed in a liquid handling or measuring system, it can effectively separate entrained air, vapors and gases without affecting the operation of other components, e.g., volumetric measuring devices, that may also be employed in the overall system.

While I have thus described preferred embodiments of the present invention, many variations will be apparent to those skilled in the art. It must therefore be understood that the foregoing description is intended to be illustrative only and not limitative of the present invention, and all such variations and modifications as are in accord with the principles described are meant to fall within the scope of the appended claims.

Having thus described my invention I claim:

1. An air eliminator for liquid handling systems comprising a vertically oriented container having a liquid inlet and a liquid outlet disposed in spaced relation to one another in a bottom end wall of said container, vertically oriented porous barrier means within said container subdividing the interior of said container into first and second separate chambers that are disposed in side-by-side relation to one another, the lower end of said first chamber being in direct communication with said liquid inlet, the lower end of said second chamber being in communication with said liquid outlet via a modulating valve that is located in said second chamber, said vertically oriented barrier means comprising a sheet of porous material whose pores are sized to permit the flow of liquid in a generally horizontal direction from said first chamber to said second chamber through said porous material while preventing the passage therethrough of any air which is entrained in incoming liquid supplied via said liquid inlet to said first chamber, an air vent adjacent the top end wall of said container for keeping the air pressure within said container at atmospheric pressure, incoming liquid supplied to said liquid inlet entering said first chamber below existing liquid in said first chamber and accumulating in a first body of liquid in said first chamber which seeps in said generally horizontal direction through said porous material to form a second body of liquid in said second chamber, entrained air in the incoming liquid accumulating on the surface of said porous material facing said first chamber and bubbling vertically upwardly through said first body of liquid in a direction parallel to said sheet of porous material to the surface of the first body of liquid in said first chamber and into an air space in said first chamber which is located above the surface of said first body of liquid and which is maintained at atmospheric pressure by said air vent whereafter entrained air that has been separated from said first body of liquid escapes from said container through said air vent, said modulating valve being responsive to the level of liquid in said second chamber and being operable to achieve a balance of flow between the liquid entering the lower end of said first chamber through said liquid inlet and the liquid leaving the lower end of said second chamber through said liquid outlet.

2. The air eliminator of claim 1 wherein said liquid handling system is a fuel line in a diesel engine.

3. The air eliminator of claim 1 wherein said modulating valve comprises a valve body located within said second chamber and having a plurality of differently sized passages therein each of which, when open, is adapted to permit the flow of liquid from said second chamber to said liquid outlet, and means responsive to changes in the level of liquid in said second chamber for opening different ones of said differently sized openings thereby to vary the effective size of the liquid flow passageway through said valve body from said second chamber to said liquid outlet.

4. An air eliminator for liquid handling systems comprising a container having a liquid inlet and a liquid outlet disposed in spaced relation to one another, porous barrier means within said container subdividing the interior of said container into first and second separate chambers, said first chamber being in direct communication with said liquid inlet and said second chamber being in communication with said liquid outlet via a modulating valve that is located in said second chamber, said barrier means comprising a porous material whose pores are sized to permit the flow of liquid from said first chamber to said second chamber through said porous material while preventing the passage therethrough of any air which is entrained in incoming liquid supplied via said liquid inlet to said first chamber, incoming liquid supplied to said liquid inlet forming a first body of liquid in said first chamber which seeps through said porous material to form a second body of liquid in said second chamber while entrained air in the incoming liquid accumulates on the surface of said porous material facing said first chamber and bubbles to the surface of the first body of liquid in said first chamber and into an air space in said first chamber located above the surface of said first body of liquid, said modulating valve being responsive to the level of liquid in said second body of liquid and being operable to achieve a balance of flow between the liquid entering said first chamber through said liquid inlet and the liquid leaving said second chamber through said liquid outlet, means defining an air outlet opening in said container which communicates with said air space in said first chamber for venting said air space to the exterior of said container and for maintaining the pressure in said air space at atmospheric pressure, said modulating valve comprising a valve body located within said second chamber and having a plurality of differently sized passages therein each of which, when open, is adapted to permit the flow of liquid from said second chamber to said liquid outlet, a float in said second chamber which is constrained to move along a linear path and which is responsive to changes in the level of liquid in said second chamber for opening different ones of said differently sized openings thereby to vary the effective size of the liquid flow passageway through said valve body from said second chamber to said liquid outlet, said plurality of passages in said valve body being oriented in directions that are transverse to said linear path, and a flexible seal attached to said float for movement with said float, a portion of said seal being disposed to overlie the ends of said passages adjacent said second chamber and to uncover different ones of said passage ends with changes in the position of said float along said linear path, the forces exerted on said seal by fluid flowing from said second chamber toward said passages being transverse to the force exerted on said seal by said float.

5. The air eliminator of claim 4 wherein said passages in said valve body are disposed in vertically spaced parallel relation to one another, said ends of said passages being located along a line that is substantially parallel to said linear path of movement of said float, each of said passages being oriented at substantially right angles to said linear path, said flexible seal comprising an elongated strip of sealing material one end of which is attached to said float and the other end of which is attached to said valve body above the uppermost one of said passages, said strip of sealing material extending in a loop configuration between its opposing ends across said ends of said passages.

6. The air eliminator of claim 5 wherein the sizes of said passages successively increase from the lowermost one of said passages to the uppermost one of said passages.

7. An air eliminator for a vehicular fuel system comprising a cylindrical container whose central axis is oriented vertically, said container having a fuel inlet and a fuel outlet disposed in spaced relation to one another in a bottom end wall of said cylindrical container, porous barrier means within said container subdividing the interior of said container into first and second separate chambers, said first chamber being in direct communication with said fuel inlet and said second chamber being in communication with said fuel outlet via a modulating valve that is located in said second chamber, said barrier means comprising a cylindrical element fabricated of a porous material and located within and coaxial with said cylindrical container, the pores in said porous material being sized to permit the flow of fuel from said first chamber to said second chamber through said porous material while preventing the passage therethrough of any air which is entrained in incoming fuel supplied via said fuel inlet to said first chamber, incoming fuel supplied to said fuel inlet forming a first body of fuel in said first chamber which seeps through said porous material to form a second body of fuel in said second chamber while entrained air in the incoming fuel accumulates on the surface of said porous material facing said first chamber and bubbles to the surface of the first body of fuel in said first chamber and into an air space in said first chamber located above the surface of said first body of fuel, said modulating valve being rersponsive to the level of fuel in said second body of fuel and being operable to achieve a balance of flow between the fuel entering said first chamber through said fuel inlet and the fuel leaving said second chamber through said fuel outlet, means defining an air outlet opening in a top end wall of said container which communicates with said air space in said first chamber for venting said air space to the exterior of said container and for maintaining the pressure in said air space at atmospheric pressure, and a base unit disposed in a vehicular fuel line and having first and second space ports which communicate respectively with spaced locations along the line, said cylindrical container being detachably mounted on said base unit, said fuel inlet being in communication with said first port, and said fuel outlet being in communication with said second port, when said cylindrical container is mounted on said base unti, said first port being located on a circle which surrounds and is coaxial with said second port, said second port being located in a threaded fitting which protrudes outwardly of said base unit, said bottom end wall of said cylindrical container having a threaded portion surrounding said fuel outlet for thread engagement with said threaded fitting in said base unit, said fuel inlet comprising a plurality of openings in said bottom end wall of said container which are located in spaced relation to one another along a circle which surrounds and is coaxial with said fuel outlet, and an annular seal disposed between said base unit and said bottom end wall of said container at a location surrounding and radially outward of said fuel inlet and first port.

8. An air eliminator for liquid handling systems comprising a cylindrical container whose central axis is oriented vertically, said container having a liquid inlet and a liquid outlet disposed in spaced relation to one another in a bottom end wall of said cylindrical container, porous barrier means within said container subdividing the interior of said container into first and second separate chambers, said first chamber being in direct communication with said liquid inlet and said second chamber being in communication with said liquid outlet via a modulating valve that is located in said second chamber, said barrier means comprising a cylindrical element fabricated of a porous material, said cylindrical element being located within and coaxial with said cylindrical container, the pores in said porous material being sized to permit the flow of liquid from said first chamber to said second chamber through said porous material while preventing the passage therethrough of any air which is entrained in incoming liquid supplied via said liquid inlet to said first chamber, incoming liquid supplied to said liquid inlet forming a first body of liquid in said first chamber which seeps through said porous material to form a second body of liquid in said second chamber while entrained air in the incoming liquid accumulates on the surface of said porous material facing said first chamber and bubbles to the surface of the first body of liquid in said first chamber and into an air space in said first chamber located above the surface of said first body of liquid, means defining an air outlet opening in a top end wall of said container which communicates with said air space in said first chamber for venting said air space to the exterior of said container and for maintaining the pressure in said air space at atmospheric pressure, said modulating valve being responsive to the level of liquid in said second body of liquid and being operable to achieve a balance of flow between the liquid entering said first chamber through said liquid inlet and the liquid leaving said second chamber through said liquid outlet, said modulating valve comprising an elongated valve body disposed within said cylindrical element of porous material along the central axis of said cylindrical element and cylindrical container, said modulating valve including an annular float disposed in surrounding relation to said elongated valve body for vertical movement within said second chamber along the exterior of said valve body, said valve body including a plurality of spaced openings therein which are adapted, when open, to permit liquid to flow from said second chamber through said valve body to said liquid outlet, and movable sealing means attached to said float for selectively opening and closing different ones of said openings as the position of said annular float varies relative to the exterior of said valve body.

9. The air eliminator of claim 8 wherein said porous material comprises a porous fluoroplastic membrane.

10. The air eliminator of claim 8 comprising a base unit disposed in a liquid flow line and having first and second spaced ports which communicate respectively with spaced locations along said line, said cylindrical container being detachably mounted on said base unit, said liquid inlet being in communication with said first port, and said liquid outlet being in communication with said second port, when said cylindrical container is mounted on said base unit.

11. The air eliminator of claim 10 wherein said liquid flow line is a vehicular fuel line.

12. The air eliminator of claim 8 wherein said plurality of spaced openings define flow passages which have a plurality of different cross-sectional sizes respectively.

13. The air eliminator of claim 8 wherein said movable sealing means comprises an elongated strip of flexible material one end of which is attached to said float and the other end of which is attached to said valve body.

* * * * *